R. S. BROWN.
WHIP.
A. I. No. 52.
Patented Apr. 1, 1842.
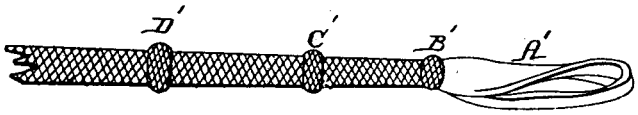
THE NORRIS PETERS CO. PHOTO-LITHO., WASHINGTON, D. C.

DEPARTMENT OF COMMERCE
UNITED STATES PATENT AND TRADEMARK OFFICE

---

MISSING PAGE(S)

PATENT NUMBER AI 52 FOR THE ISSUE DATE 04/01/1842 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims